Feb. 27, 1962 W. D. BROWN 3,022,588
CHAIN AND CUTTERS THEREFOR
Filed Jan. 13, 1960
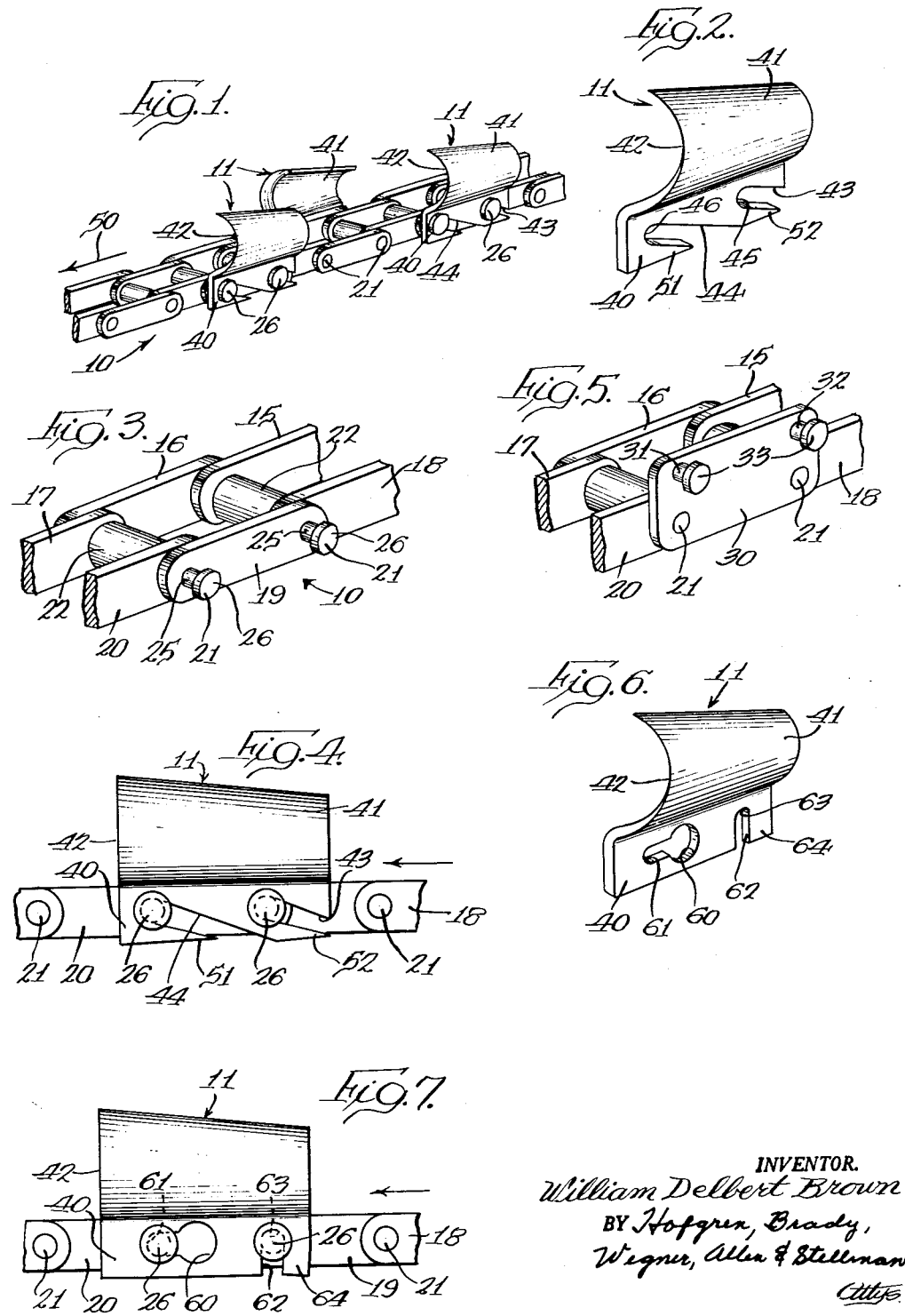
INVENTOR.
William Delbert Brown
BY Hofgren, Brady,
Wegner, Allen & Stellman
Attys.

United States Patent Office 3,022,588
Patented Feb. 27, 1962

3,022,588
CHAIN AND CUTTERS THEREFOR
William Delbert Brown, Woodbine, Iowa
Filed Jan. 13, 1960, Ser. No. 2,146
10 Claims. (Cl. 37—191)

This invention relates to a chain and cutters therefor and more particularly to the combination of a chain and cutters therefor in which the cutters may be quickly detached and attached to facilitate replacement of cutters.

An object of this invention is to provide a new and improved chain with cutters releasably and securely attached thereto to provide for quick detachment and attachment of cutters.

Another object of the invention is to provide a chain with quickly detachable cutters and in which the cutters are securely held on the chain by the cutting action due to the forces resisting the cutting more tightly securing the cutters to the chain.

Another object of the invention is to provide a cutter chain in which the cutters are provided with slots mountable on pins associated with the chain with the slots being oriented to have the cutting action of the cutter more tightly hold the cutters upon the chain but still permitting quick separation of a cutter from the chain by a blow struck against the cutter to thus permit quick change of cutters without disassembly of the chain.

Further objects and advantages will become apparent from the following detailed description taken in connection with the accompanying drawings in which:

FIG. 1 is a perspective view of a cutter chain length showing a series of cutters attached to the chain;

FIG. 2 is a perspective view of a right-hand cutter for use with the chain;

FIG. 3 is a perspective view of a chain section similar to that shown in FIG. 1 with the cutter removed;

FIG. 4 is a side elevational view of a length of chain and showing a cutter attached thereto;

FIG. 5 is a perspective view of a modification of the chain construction;

FIG. 6 is a perspective view of a second embodiment of the cutter usable with the chain; and FIG. 7 is a side elevational view of a length of chain such as shown in FIG. 3 with the cutter embodiment of FIG. 6 mounted thereon.

While this invention is susceptible of embodiments in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

As shown in FIGS. 1 and 3, the cutter chain embodies a chain indicated generally at 10 and one or more cutters indicated generally at 11 with the cutters mounted on the chain in a desired arrangement. The chain 10 normally is endless and carries a plurality of the cutters 11, with the cutters shown in FIG. 1 suitable for use with a trenching machine which cuts and conveys soil or other material to form a trench for laying of conduits and the like. In FIG. 1, a pair of the cutters 11 are mounted to define right-hand cutters with the intermediate cutter being a left-hand cutter.

The chain 10 embodies a series of pairs of links with the links 15, 16 and 17 forming the left-hand links and the links 18, 19 and 20 forming the right-hand links of respective pairs. Each adjacent pair of links is pivotally interconnected by a pin 21 extending through suitable openings in the link ends (not shown) with a spacing collar 22 surrounding each pin and maintaining spacing between the pairs of links.

In order to mount a cutter to the chain a pair of the connecting pins 21 are formed with extensions 25 extending laterally outwardly beyond the side of the chain and having enlarged ends 26 with the pin extensions 25 being arranged in pairs at any desired frequency along the length of the chain.

An alternate embodiment of the chain is shown in FIG. 5 in which a wider chain link is substituted in place of the chain link 19 shown in FIG. 3 with this link 30 being attached to the chain by the pins 21 and carrying a pair of pin extensions 31 and 32 each having enlarged ends 33.

A first embodiment of the cutter usable with the chain of FIG. 3 or the chain of FIG. 5 is shown in FIGS. 1, 2 and 4 and has a body with a base 40 and a curved blade 41 having a leading edge 42 defining a cutting edge. The base has a pair of slots 43 and 44 opening out to the perimeter of the cutter body and each having a closed bottom 45 and 46, respectively. The slots 43 and 44 are inclined toward the leading edge 42 of the cutter and have the slot bottoms 45 and 46 nearest said leading edge whereby a cutter may be associated with the chain in the manner shown in FIGS. 1 and 4 by insertion of the pin extensions 25 in the slots 43 and 44. With the chain 10 traveling in the direction of the arrow 50 in FIG. 1 the leading edge 42 of the cutter performs the cutting action and the forces resisting this action result in firmly seating the cutter slot bottoms 45 and 46 on the pin extensions 25. This action in addition to the relatively tight fit of the cutter base 40 between the chain link 19 and the enlarged ends 26 of the pin extensions results in securely holding the cutter to the chain, however this connection may be made even more secure by slightly deforming the portions 51 and 52 of the cutter base 40 adjacent the slots 43 and 44 to bend in these portions against the chain link 19.

The cutter 11 is placed on the chain by hammering the cutter onto the pin extensions and the cutter may be readily released from the chain by hammer blows.

The mounting of the cutter 11 to the chain embodiment shown in FIG. 5 is accomplished in the same manner as described with reference to the chain embodiment of FIG. 3.

Another embodiment of cutter 11 is shown in FIGS. 6 and 7 in which the cutter differs in the arrangement of slots in the cutter base 40. The base has a keyhole slot 60 with the smallest part 61 thereof nearest the leading edge 42 of the cutter and the enlarged end of the keyhole slot of a size to permit insertion of the enlarged pin end 26 therethrough. A second slot 62 in the cutter base 40 extends vertically therein and opens to the perimeter of the body and has a slot bottom 63 at the upper end of the slot. With this construction, the keyhole slot 60 is first associated with one of the pin extensions 25 or 31 and the narrower part of the slot 61 is seated on the pin extension and the cutter is then swung clockwise as viewed in FIG. 7 to place the slot 62 on the other chain pin extension. In this form, the cutting action again firmly secures the cutter on the chain by the cutting forces tending to tilt the cutter clockwise, as viewed in FIG. 7, to firmly seat the slot bottom 63 on the pin extension 25 or pin extension 32. A portion 64 of the cutter base is deformable so that it may be bent in against the chain link 19 to aid in securely holding the cutter to the chain.

The structure of a right-hand cutter 11 has been shown in detail and it will be seen that the structure of the left-hand cutter 11 is a mirror image of the right-hand cutter.

With the foregoing structure when the cutting edges of the cutters become such as to require change of cutters the change may be easily effected by hammering off the old cutters and hammering on sharp ones right in the

I claim:

1. A chain and cutter therefor comprising a series of links connected end-to-end by a plurality of transverse connecting pins with one pin connecting adjacent links, an adjacent pair of said pins having lateral extensions outwardly beyond the adjacent links and having enlarged ends, a cutter carried by the chain and having a pair of slots with closed bottoms each receiving one of said pin extensions and removably associated therewith, at least one of said slots opening to the periphery of the cutter, said bottoms seating on said pin extensions and being urged thereagainst during cutting action of the cutter.

2. A cutter and chain combination comprising, a plurality of pairs of links with ends of adjacent pairs pivotally interconnected, a cutter associated with the chain, means for releasably connecting the cutter to the chain including a pair of rigidly interconnected pins carried by the chain, and means defining a pair of slots in the cutter permitting sliding attachment of the cutter to the chain, said slots having surfaces firmly seated on the pins due to the cutting action of the cutter.

3. A cutter for releasable attachment to a cutter chain comprising, a base with a blade extending therefrom having a cutting edge, a keyhole slot and a slot open at one end in said base adapted to receive pins carried on the chain, said last referred to slot terminating in a bottom at the end of the slot nearest the cutting edge whereby forces resisting the cutter during cutting tend to firmly engage the slot bottom against its pin.

4. A cutter and chain combination comprising, a plurality of links pivotally interconnected end-to-end by a pin extending between adjacent link ends, an extension of each of a pair of pins beyond the side of the links with enlarged ends forming a mounting for a cutter, and a cutter having a body with a pair of inclined closed bottom slots extending toward the leading edge of the cutter and opening out to the perimeter of the cutter remote from said leading edeg with the cuter mounted on the pins by location of the pin extensions in said slots.

5. A cutter as defined in claim 4 in which portions of the cutter adjacent the slots are deformable to aid in locking the cutter to the chain.

6. A chain and cutter combination comprising a plurality of links pivotally interconnected end-to-end by a pin extending between adjacent link ends, an extension of each of a pair of pins beyond the side of the links with enlarged ends forming a mounting for a cutter, a cutter having a body with a keyhole slot having its smallest end nearest the leading edge of the cutter, and a second slot opening out to the perimeter of the cutter at one end whereby the cutter is attached to the chain by location of one pin extension in the keyhole slot and pivoting of the cutter to place the other pin extension in said second slot, said second slot being at a distance from the keyhole slot to maintain the smallest end of the keyhole slot associated with its pin extension.

7. A cutter chain as defined in claim 6 in which a portion of the cutter adjacent said second slot is deformable to aid in locking the cutter to the chain.

8. A chain and cutter combination comprising, a plurality of pivotally interconnected chain links, means for supporting a cutter on the chain including a mounting plate having a pair of pin extensions in fixed spaced relation with enlarged ends extending laterally away from the side of the chain, and a cutter releasably carried by the chain including slots formed therein which releasably engage said pin extensions for mounting of the cutter thereto.

9. A device as defined in claim 8 in which the cutter has a body with a pair of inclined closed bottom slots extending toward the leading edge of the cutter and opening out to the perimeter of the cutter whereby the cutter may be mounted on the pin extensions by insertion of the pin extensions in said slots.

10. A device as defined in claim 8 in which the cutter has a body with a keyhole slot with its smallest end nearest the leading edge of the cutter, and a second slot opening out to the perimeter of the cutter at one end whereby the cutter may be attached to the pin extensions by insertion of one extension into the keyhole slot and pivoting of the cutter to place the other pin extension into said second slot, said second slot being at a distance from the keyhole slot to maintain the smallest end of the keyhole slot associated with its pin extension.

References Cited in the file of this patent

UNITED STATES PATENTS

| | | |
|---|---|---|
| 834,251 | Bailey | Oct. 30, 1906 |
| 931,763 | Humphreys | Aug. 24, 1909 |
| 1,611,880 | Brown | Dec. 28, 1926 |
| 2,748,504 | McIninch | June 5, 1956 |

FOREIGN PATENTS

| | | |
|---|---|---|
| 114,670 | Sweden | Aug. 14, 1945 |